(12) United States Patent
Chiu

(10) Patent No.: US 9,776,094 B2
(45) Date of Patent: Oct. 3, 2017

(54) MAHJONG GAME SYSTEM USING TOUCH PANEL

(71) Applicant: Egenpower Inc., Laguna Niguel, CA (US)

(72) Inventor: Yao-Hsi Chiu, Taichung (TW)

(73) Assignee: Egenpower Inc., Laguna Niguel, CA (US)

( * ) Notice: Subject to any disclaimer, the term of this patent is extended or adjusted under 35 U.S.C. 154(b) by 176 days.

(21) Appl. No.: 14/742,156

(22) Filed: Jun. 17, 2015

(65) Prior Publication Data

US 2016/0296844 A1 Oct. 13, 2016

(30) Foreign Application Priority Data

Apr. 13, 2015 (TW) .............................. 104111840 A

(51) Int. Cl.
| | |
|---|---|
| *A63F 9/24* | (2006.01) |
| *A63F 13/80* | (2014.01) |
| *A63F 13/215* | (2014.01) |
| *A63F 13/235* | (2014.01) |
| *G06F 3/0488* | (2013.01) |
| *A63F 9/20* | (2006.01) |
| *A63F 13/426* | (2014.01) |
| *A63F 13/24* | (2014.01) |

(Continued)

(52) U.S. Cl.
CPC ................ *A63F 13/80* (2014.09); *A63F 9/20* (2013.01); *A63F 13/214* (2014.09); *A63F 13/215* (2014.09); *A63F 13/235* (2014.09); *A63F 13/24* (2014.09); *A63F 13/323* (2014.09); *A63F 13/426* (2014.09); *G06F 3/0488* (2013.01); *A63F 2009/205* (2013.01); *A63F 2009/241* (2013.01); *A63F 2009/2433* (2013.01)

(58) Field of Classification Search
CPC .... G07F 17/3295; G07F 17/322; A63F 13/12; A63F 13/80; A63F 13/2145; A63F 2009/205
See application file for complete search history.

(56) References Cited

U.S. PATENT DOCUMENTS

| | | | |
|---|---|---|---|
| 2006/0049580 A1* | 3/2006 | Chung | ...................... A63F 1/00 273/149 R |
| 2008/0076505 A1* | 3/2008 | Nguyen | .................. G07F 17/32 463/16 |

(Continued)

FOREIGN PATENT DOCUMENTS

| | | | |
|---|---|---|---|
| TW | 529961 B | 5/2003 | |
| WO | WO 2008019313 A2 * | 2/2008 | ............. G07F 17/32 |

*Primary Examiner* — Steve Rowland
(74) *Attorney, Agent, or Firm* — Muncy, Geissler, Olds & Lowe, P.C.

(57) ABSTRACT

A mahjong game system using touch panel includes: a computer, and four player consoles in communication with the computer by a wired or wireless communication method. The computer includes a touch panel at the top side for displaying game pictures and a mahjong game program installed therein and providing a speech recognition process for identifying multiple specific voice commands. The four player consoles are individual touch panels having an elongated shape. Each player console defines a tiles-in-hand displaying portion and a command displaying portion. Further, a voice sensor is installed in the computer or each player console.

11 Claims, 7 Drawing Sheets

(51) Int. Cl.
  *A63F 13/214* (2014.01)
  *A63F 13/323* (2014.01)

(56) References Cited

U.S. PATENT DOCUMENTS

| | | | |
|---|---|---|---|
| 2010/0041456 A1* | 2/2010 | Yu | A63F 3/00643 |
| | | | 463/10 |
| 2012/0214593 A1* | 8/2012 | Haltovsky | A63F 13/31 |
| | | | 463/31 |
| 2013/0012320 A1* | 1/2013 | Bellinghausen | A63F 13/10 |
| | | | 463/37 |
| 2015/0018059 A1* | 1/2015 | Chen | A63F 13/35 |
| | | | 463/9 |
| 2015/0254924 A1* | 9/2015 | Pececnik | G07F 17/3218 |
| | | | 463/25 |

* cited by examiner

MAHJONG GAME SYSTEM USING TOUCH PANEL

BACKGROUND OF THE INVENTION

1. Field of the Invention

The present invention relates to mahjong games and more particularly, to a mahjong game system using touch panel.

2. Description of the Related Art

Taiwan Patent 529961 discloses a mahjong game system, which mainly comprises a host and four player consoles. The host comprises a microprocessor and a main display. The microprocessor of the host runs a mahjong game program. The main display displays the mahjong game content. Each player console has a vertical part and a horizontal part, exhibiting an L-shaped cross section. The vertical part of each player console defines a tile-in-hand displaying mechanism and a menu displaying portion. The tile-in-hand displaying mechanism of each player console is adapted for displaying the tiles in the hand of the respective player in such a manner that the displayed tiles are not visible to the other players. The menu displaying portion is adapted for properly displaying the behaviors to be executed by the respective player corresponding to the processing of the mahjong game. The horizontal part of each player console comprises a press-button unit for inputting behaviors for display on the menu displaying portion. Thus, when playing the game, the players can substantially achieve the playing of a conventional mahjong game. Further, the mahjong game system is convenient for carrying.

The object of the aforesaid prior art mahjong game system is to substantially realize the same situations of the playing of a real conventional mahjong game. However, in a real mahjong game, every player will shout some specific words, such as "Hu", "Piing", "Gong", "Chow", etc., letting the players enjoy the sense of participation. However, the aforesaid prior art mahjong game system cannot render the play of shouting specific voice commands. The press-button and cursor control manner of the press-button unit of the respective player console is inconvenient to perform, causing distress on the manufacturing and assembling of buttons. Therefore, this prior art mahjong game system still has room for improvement.

SUMMARY OF THE INVENTION

The present invention has been accomplished under the circumstances in view. It is the main object of the present invention to provide a mahjong game system using touch panel, which enables the player to play a real mahjong game.

To achieve this and other objects of the present invention, a mahjong game system using touch panel comprises a computer and four player consoles. The computer comprises a touch panel located at the top side thereof. The computer and the touch panel are electrically connected. The computer has installed therein a mahjong game program. The mahjong game program comprises a speech recognition process for identifying multiple specific voice commands. The computer runs the mahjong game program. The touch panel displays game pictures. Further, the touch panel defines a discarded tile displaying portion for displaying discarded tiles, a rest tile displaying portion for displaying closed tiles, and four Chow-Pung-Kong tile displaying portions. The four player consoles are individual touch panels, having an elongated shape. Each player console defines a tiles-in-hand displaying portion and a command displaying portion. The tiles-in-hand displaying portion is adapted for displaying the tiles in the hand of the respective player. The command displaying portion is adapted for enabling the computer to receive multiple specific game commands. The four player consoles and the computer can be linked by a wired communication method or wireless communication method. The player can click the tiles-in-hand displaying portion to select one of the tiles in hand to be discarded, causing the tiles-in-hand displaying portion to discard one of the tiles in hand. Further, at least one voice sensor is installed in the computer, or each player console.

Thus, when one player shouted a voice command, the voice sensor of the respective player console picks up the voice command, causing the computer to execute the speech recognition process in identifying the shouted specific voice command, realizing the playing of a real mahjong game. Further, because the player consoles are individual touch panels without any physical button, the invention eliminates the distress of the manufacturing and assembling of buttons.

Other advantages and features of the present invention will be fully understood by reference to the following specification in conjunction with the accompanying drawings, in which like reference signs denote like components of structure.

DETAILED DESCRIPTION OF THE INVENTION

Figure 1:
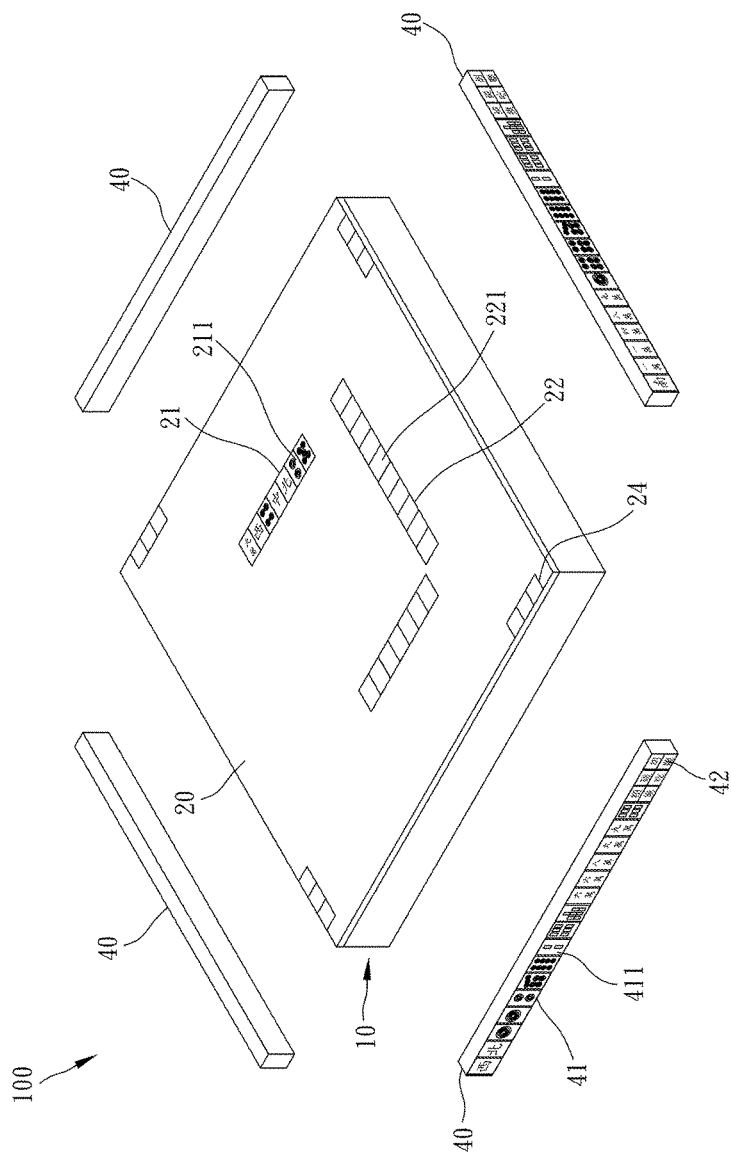
FIG. 1 is an oblique top elevational view of a mahjong game system using touch panel in accordance with a first embodiment of the present invention.
Figure 2:
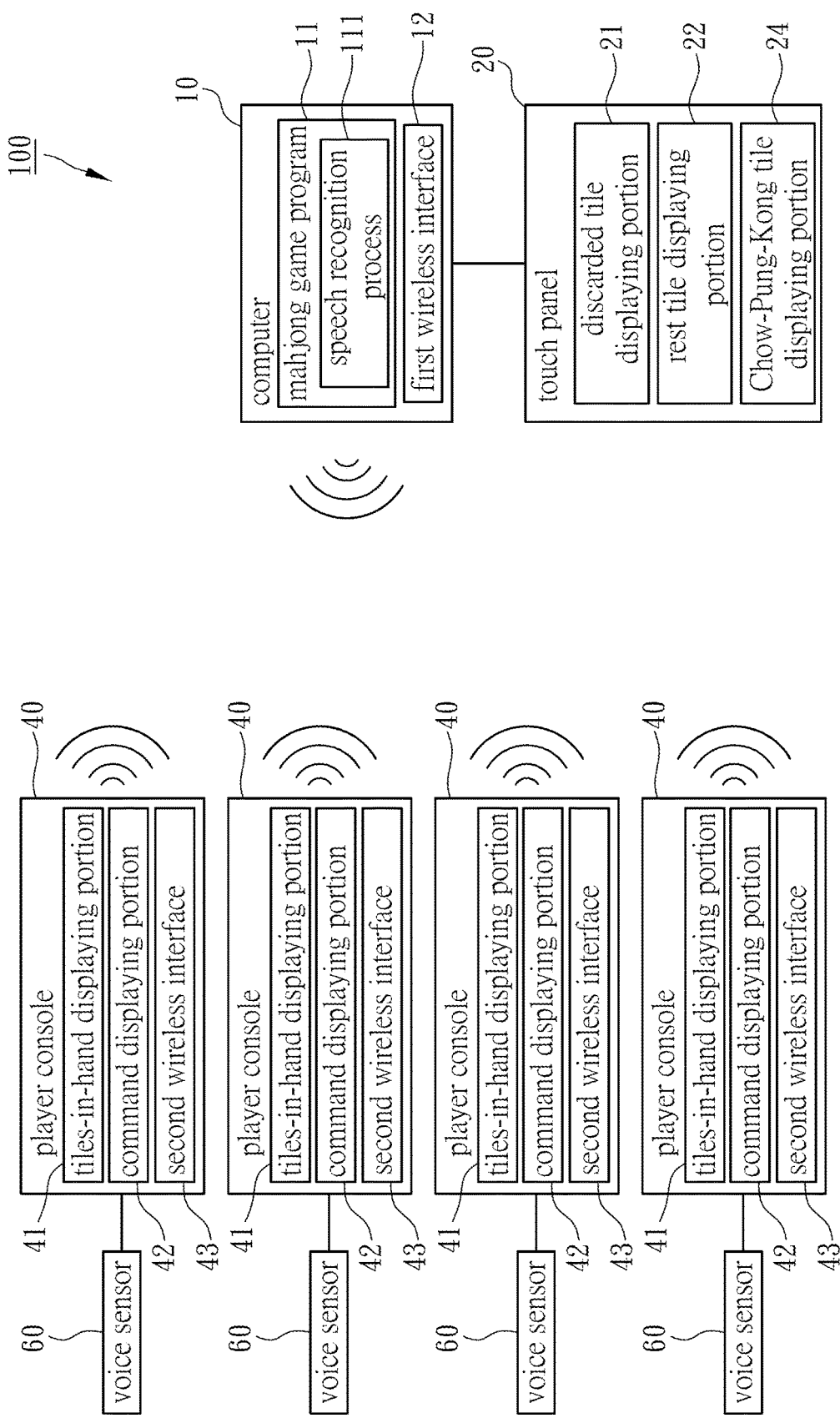
FIG. 2 is a block diagram of the first embodiment of the present invention, illustrating the four player consoles and the computer linked in a wireless manner.

Referring to FIGS. 1 and 2, a mahjong game system 100 using touch panel in accordance with a first embodiment of the present invention is shown. The mahjong game system 100 using touch panel comprises a computer 10 and four player consoles 40.

A touch panel 20 is mounted at a top side of the computer 10. The computer 10 and the touch panel 20 are electrically coupled together. The computer 10 has built therein a mahjong game program 11. The mahjong game program 11 comprises a speech recognition process 111 adapted for identifying multiple specific voice commands. The computer 10 is adapted for running the mahjong game program 11. The touch panel 20 is adapted for displaying game pictures. The touch panel 20 defines a discarded tile displaying portion 21 for displaying discarded tiles 211, a rest tile displaying portion 22 for displaying closed tiles 221, and four Chow-Pung-Kong tile displaying portions 24. In this first embodiment, the specific voice commands are: "Hu" (complete a winning hand), "Pung" (take a tile to complete a set of three identical tiles), "Kong" (take a tile to complete a set of four identical tiles), "Ting" (waiting hand/on the spot), "Chow" (take a tile to complete a straight) and "Mo" (draw a tile). The computer 10 further comprises a first wireless interface 12, as shown in FIG. 2.

The four player consoles 40 are individual touch panels, having an elongated shape. Each player console 40 defines a tiles-in-hand displaying portion 41 and a command displaying portion 42. The tiles-in-hand displaying portion 41 is adapted for displaying the tiles in hand 411 of the respective players. The command displaying portion 42 is adapted for enabling the computer 10 to receive multiple specific game commands. The four player consoles 40 and the computer 10 are electrically connected by a wired or wireless communication technique. The player clicks one of the tiles in hand 411 that are displayed on the tiles-in-hand displaying portion 41 and to be discarded, enabling the clicked one of the tiles in hand 411 to be discarded. In this first embodiment, the four player consoles 40 and the computer 10 are linked by a wireless communication method. Each player console 40 further comprises a second wireless interface 43, as illustrated in FIG. 2. Further, the aforesaid wireless communication method is a RF (Radio frequency) communication method achieved through the first wireless interface 12 and the second wireless interfaces 43 of the four player consoles 40, as shown in FIG. 2. Further, the aforesaid RF (Radio frequency) communication method can be Bluetooth, Wi-Fi or other wireless communication protocol. Further, the aforesaid specific game command can be "Hu", "Pung", "Kong", "Ting", "Chow" or "Mo".

The mahjong game system 100 using touch panel further comprises at least one voice sensor 60 mounted in at least one of the computer 10 and the four player consoles 40. In this first embodiment, each player console 40 has mounted a voice sensor 60.

After understanding the structural arrangement of the first embodiment of the present invention, the application of this first embodiment is outlined hereinafter.

Referring to FIGS. 1 and 2 again, each game player operates the respective player console 40. Every game player can simply see the tiles-in-hand displaying portion 41 and the command displaying portion 42 of the respective player console 40. The mahjong game modes of drawing a tile, discarding a tile and taking a tile to complete a set of three are explained hereinafter by way of one game player. When the player performs the action of drawing a tile, one closed tile 221 is automatically shifted from the rest tile displaying portion 22 and displayed on the tiles-in-hand displaying portion 41 of the player console 40. When going to discard a tile, the player clicks one of the tiles in hand 411 that are displayed on the tiles-in-hand displaying portion 41 and to be discarded. At this time, the clicked one of the tiles in hand 411 is shifted from the tiles-in-hand displaying portion 41 and displayed on the discarded tile displaying portion 21 of the touch panel 20. When the player is going to take a tile to complete a set of three identical tiles and said "Pung", the voice sensor 60 of the player console 40 receives the voice of "Pung", and then the speech recognition process 111 of the computer 10 executes a specific voice command recognition function. At this time, the tiles in hand 411 for matching with the called tile to complete a set of three identical tiles are shifted from the tiles-in-hand displaying portion 41 and displayed on the Chow-PuntKong tile displaying portion 24 of the touch panel 20. If the player console 40 gives no reaction after the player said "Pung", the player can click the called tile from the command displaying portion 42, enabling the computer 10 to receive the command of "Pung" so that the tiles in hand 411 for matching with the called tile to complete a set of three identical tiles can be shifted from the tiles-in-hand displaying portion 41 of the player console 40 and displayed on the Chow-Pung-Kong tile displaying portion 24 of the touch panel 20. The above mahjong game is described on the basis of the relevant key points of the present invention. Since the Mahjong rules are known to the public, no further detailed description of the other parts of the game will be necessary.

It can be seen from the above, the invention achieves the effects of: solving the drawbacks of the prior art mahjong game system that the system cannot render the playing method of shouting the command as seen in a real mahjong game and that every player needs to operate the press-buttons of the press-button portion of the respective player console for cursor control in a complicated manner.

After one player shouted a command, the voice sensor 60 of the respective player console 40 receives the voice, and the speech recognition process 111 of the computer 10 executes the specific voice command recognition function, realizing the playing method of shouting a command as seen in a real mahjong game. Since the four player consoles 40 are individual touch panels, every player can operate the respective player console 40 conveniently by touching. Because the player consoles 40 are individual touch panels without any physical button, the invention eliminates the distress of the manufacturing and assembling of buttons.

In the above-described application example of the first embodiment of the present invention, the specific voice command is "Pung". In actual application, the specific voice command "Hu", "Kong", "Ting", "Chow" or "Mo". The player can also click one of the commands of "flu" "Pung", "Kong", "Ting", "Chow" and "Mo" that are displayed on the command displaying portion 42.

It is to be noted that in the aforesaid first embodiment of the present invention, the discarded tile displaying portion 21 and the rest tile displaying portion 22 are located on a center area of the touch panel 20, and the Chow-Pung-Kong tile displaying portions 24 are respectively located in the four corners of the touch panel 20, as shown in FIG. 1. However, this arrangement is not a limitation. The position of the discarded tile displaying portion 21 and the position of the rest tile displaying portion 22 can be exchanged; the four Chow-Pung-Kong tile displaying portions 24 can be respectively located on the four border sides of the touch panel 20 on the middle, i.e., the four Chow-Pung-Kong tile displaying portions 24 can be respectively disposed at a rear side relative to the discarded tile displaying portion 21 and the rest tile displaying portion 22.

Further, it is to be noted that the computer 10 can download TV signals from the internet via the first wireless interface 12 or by a wired method, and play the downloaded TV signals through the touch panel 20.

Figure 3:
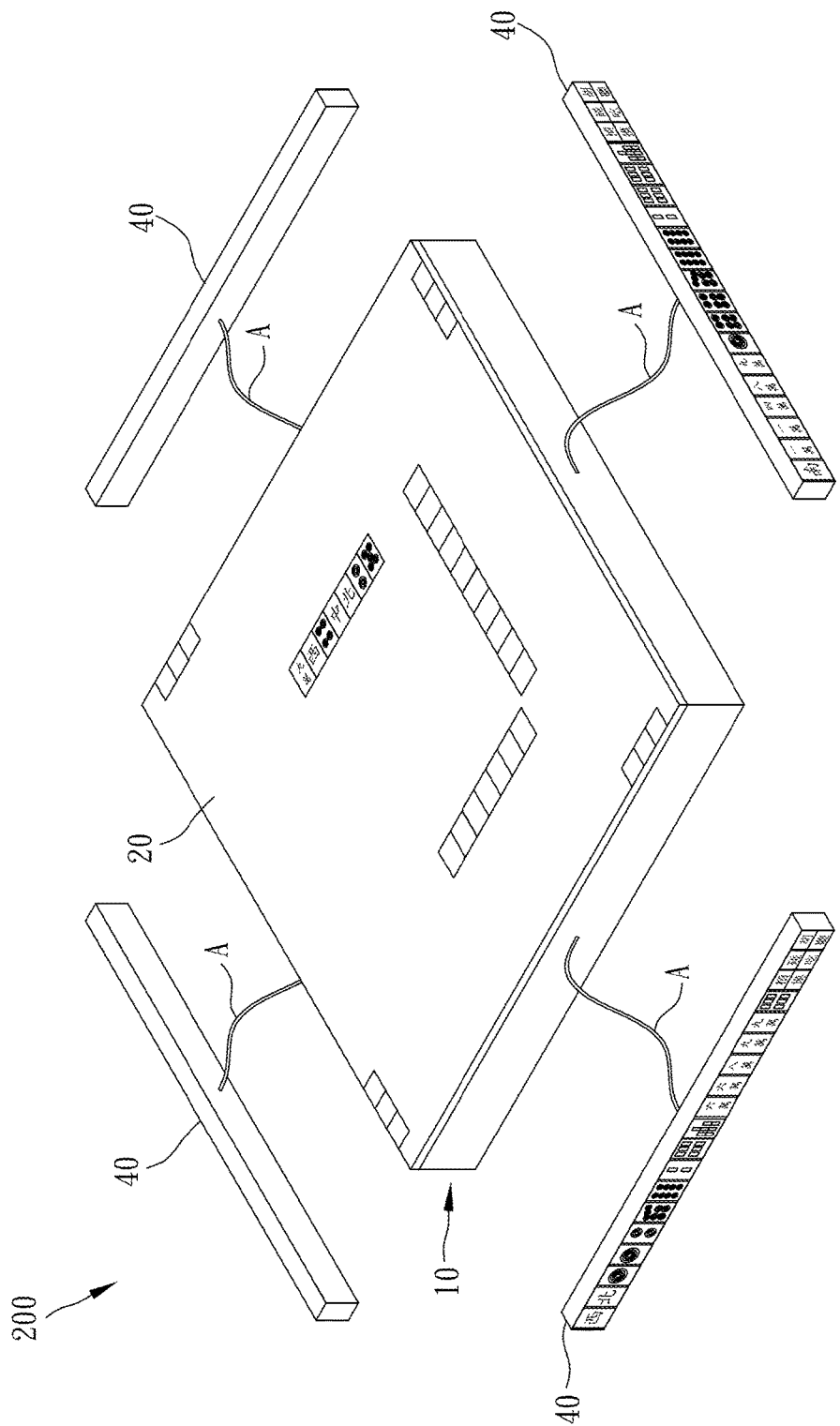
FIG. 3 is an oblique top elevational view of a mahjong game system using touch panel in accordance with a second embodiment of the present invention, illustrating four player consoles respectively electrically connected to a computer with a respective cable.

Referring to FIG. 3, a mahjong game system 200 using touch panel in accordance with a second embodiment of the present invention is shown. This second embodiment is substantially similar to the aforesaid first embodiment with the exceptions as follows:

The four player consoles 40 are respectively electrically connected to the computer 10 by a respective cable A.

The other structural details of this second embodiment are same as the aforesaid first embodiment, and thus, let not repeat them.

Figure 4:
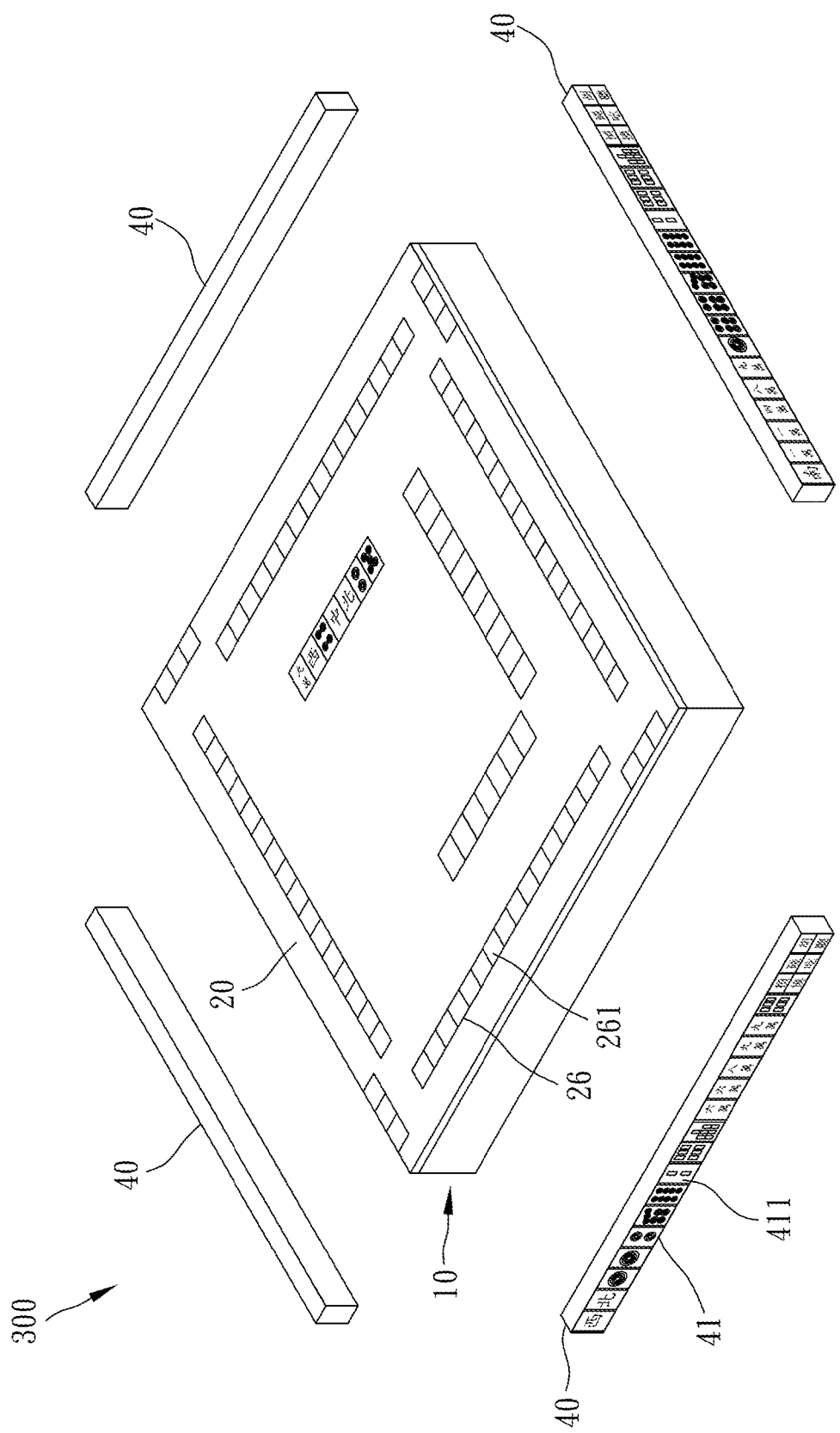
FIG. 4 is an oblique top elevational view of a mahjong game system using touch panel in accordance with a third embodiment of the present invention, illustrating four rest-tiles-in-hand displaying portions defined in the touch panel at the top side of the computer.

Referring to FIG. 4, a mahjong game system 300 using touch panel in accordance with a third embodiment of the present invention is shown. This third embodiment is substantially similar to the aforesaid first embodiment with the exceptions as follows:

The touch panel 20 further defines rest-tiles-in-hand displaying portions 26 adapted for displaying the rest tiles in hands 261 of the respective players. The rest tiles in hand 261 displayed on the rest-tiles-in-hand displaying portions 26 correspond to the tiles in hand 411 displayed on the tiles-in-hand displaying portions 41 of the respective player consoles 40.

The other structural details of this third embodiment are same as the aforesaid first embodiment, and thus, let not repeat them.

Figure 5:
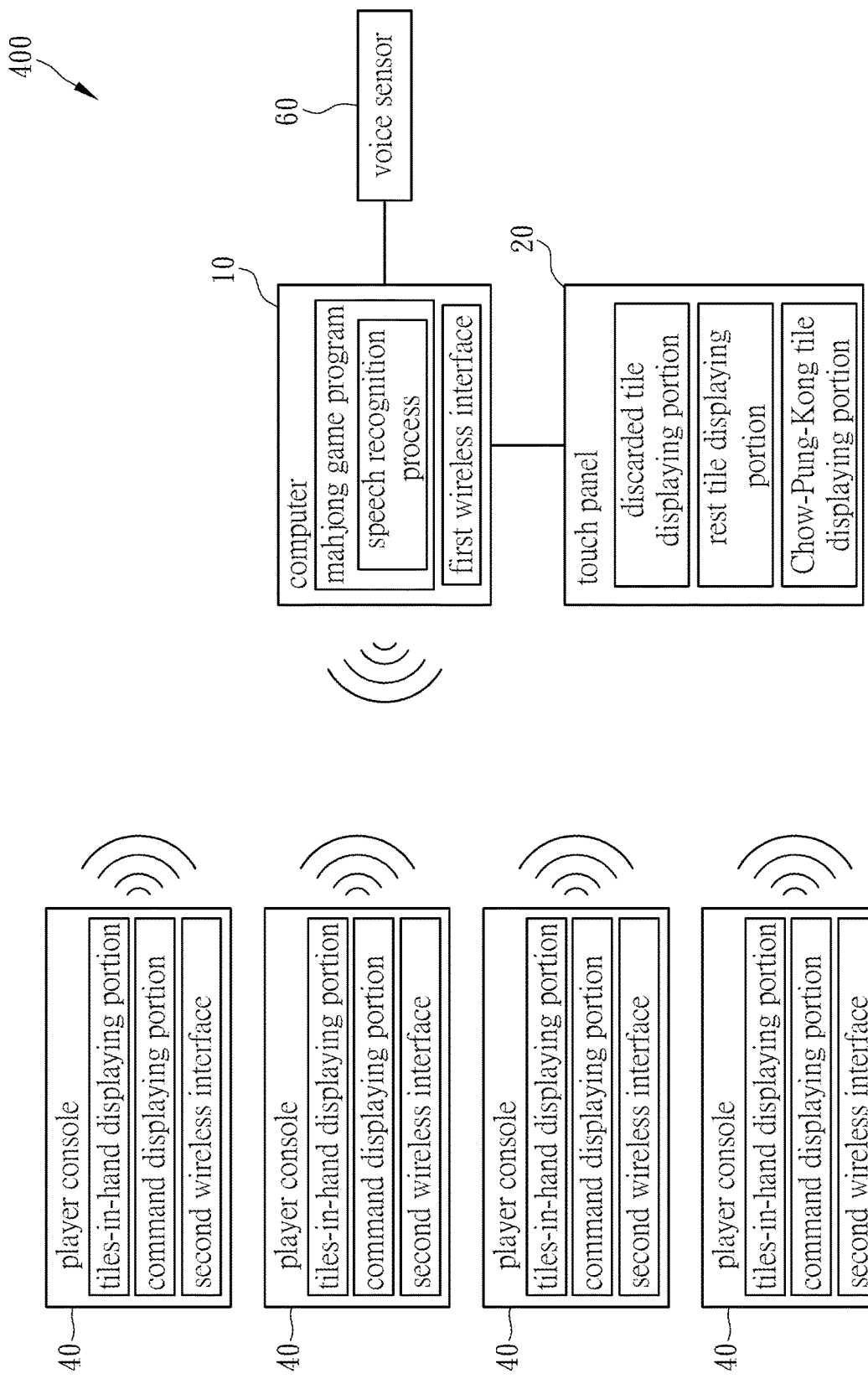
FIG. 5 is a block diagram of a mahjong game system using touch panel in accordance with a fourth embodiment of the present invention, illustrating a voice sensor installed in the computer.

Referring to FIG. 5, a mahjong game system 400 using touch panel in accordance with a fourth embodiment of the present invention is shown. This fourth embodiment is substantially similar to the aforesaid first embodiment with the exceptions as follows:

The computer 10 has built the eat least one voice sensor 60. In this fourth embodiment, the computer 10 has built one voice sensor 60. However, this arrangement is not a limitation. In actual application, the computer 10 can be configured to provide two or more than two voice sensors 60. Since the aforesaid method can easily be understood through the present fourth embodiment, let not represent them with drawings.

The other structural details of this fourth embodiment are same as the aforesaid first embodiment, and thus, let not repeat them.

Figure 6:
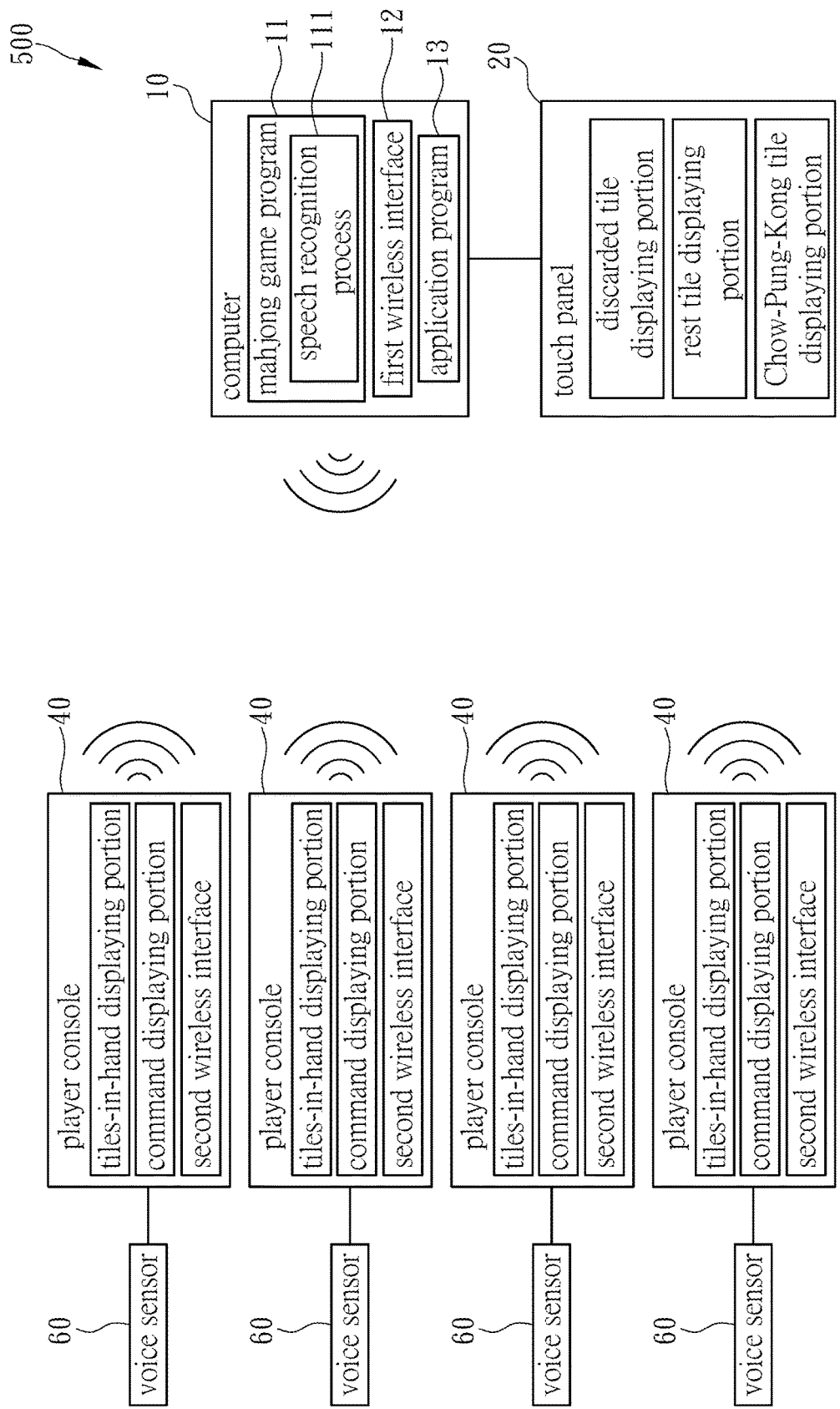
FIG. 6 is a block diagram of a mahjong game system using touch panel in accordance with a fifth embodiment of the present invention, illustrating an application program installed in the computer.

Referring to FIG. 6, a mahjong game system 500 using touch panel in accordance with a fifth embodiment of the present invention is shown. This fifth embodiment is substantially similar to the aforesaid first embodiment with the exceptions as follows:

The computer 10 has built an application program (APP) 13. The computer 10 runs the application program 13. Further, the computer 10 downloads the application program 13 from the Internet via the first wireless interface 12 or by means of a wired method, and then installs the application program 13. In this fifth embodiment, the application program 13 can be a chess game program, monopoly game program, or any other puzzle game program.

The other structural details of this fifth embodiment are same as the aforesaid first embodiment, and thus, let not repeat them.

Figure 7:
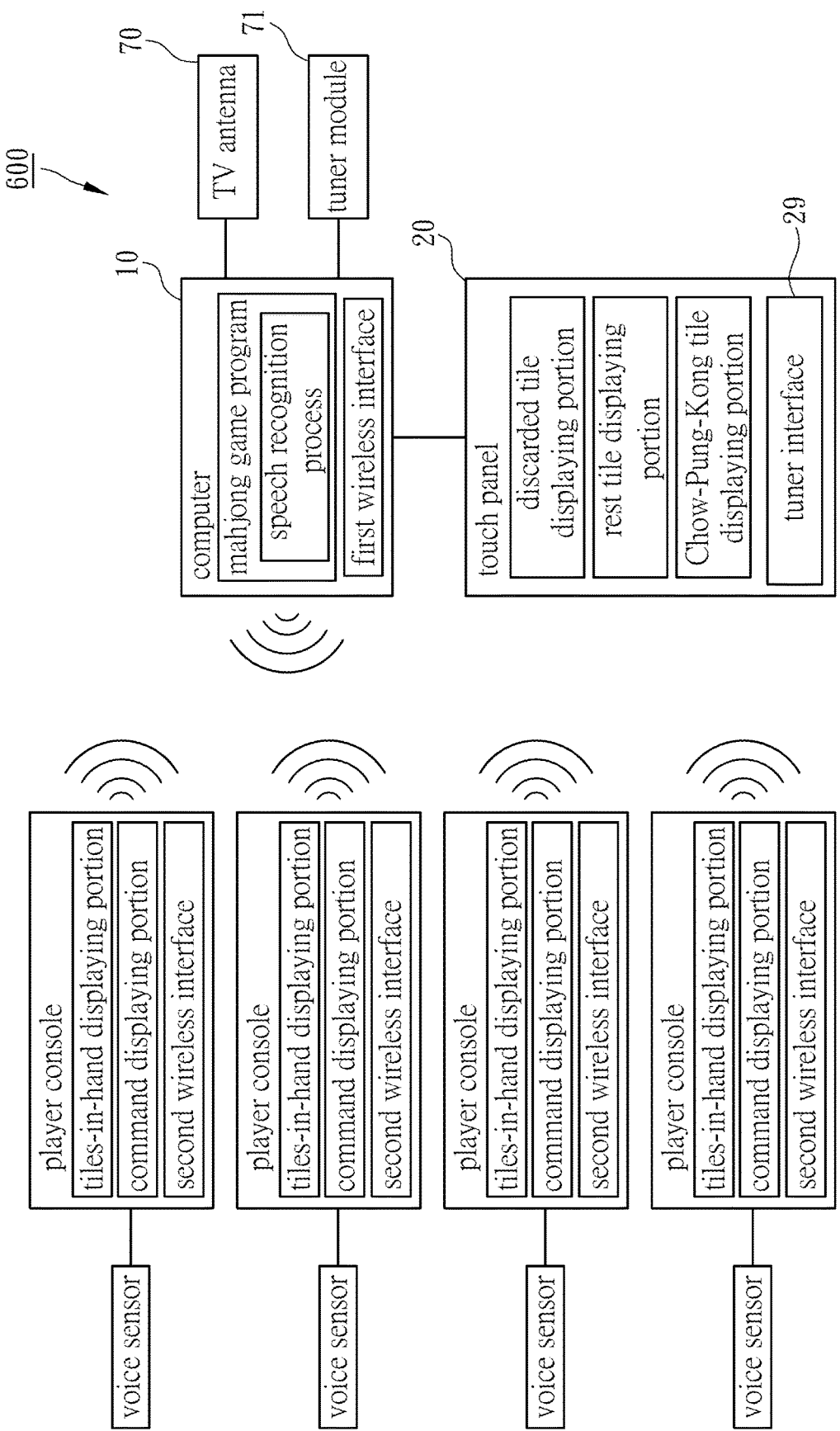
FIG. 7 is a block diagram of a mahjong game system using touch panel in accordance with a sixth embodiment of the present invention, illustrating a TV antenna and a tuner module installed in the computer.

Referring to FIG. 7, a mahjong game system 600 using touch panel in accordance with a sixth embodiment of the present invention is shown. This sixth embodiment is substantially similar to the aforesaid first embodiment with the exceptions as follows:

The computer 10 comprises a TV antenna 70 and a tuner module 71. The tuner module 71 is electrically connected to the TV antenna 70 and the computer 10. The computer 10 displays a tuner interface 29 on the touch panel 20 for allowing the user to control the tuner module 71 for selecting channels. The TV antenna 70 is adapted for receiving wireless TV signals. Through the tuner interface 29, the user can select the desired channel, enabling the received TV signal to be played on the touch panel 20.

In actual application, the tuner module 71 and the TV antenna 70 can be installed inside the computer 10.

The other structural details of this sixth embodiment are same as the aforesaid first embodiment, and thus, let not repeat them.

What is claimed is:

1. A mahjong game system using touch panel, comprising:
a computer comprising a touch panel disposed at a top side thereof, said computer and said touch panel being electrically connected together, said computer having built therein a mahjong game program, said mahjong game program comprising a speech recognition process for identifying multiple specific voice commands, said computer being adapted for running said mahjong game program, said touch panel being adapted for displaying game pictures, said touch panel defining a discarded tile displaying portion for displaying discarded tiles, a rest tile displaying portion for displaying closed tiles and four Chow-Pung-Kong tile displaying portion;
four player consoles, each said player console being an individual touch panel and having an elongated shape, each said player console defining a tiles-in-hand displaying portion and a command displaying portion, said tiles-in-hand displaying portion being adapted for displaying the tiles in the hand of one respective player, said command displaying portion being adapted for enabling said computer to receive specific game commands, said four player consoles and said computer being selectively linked through a wired communication means or wireless communication means, said tiles-in-hand displaying portion of each said player console being clickable by one respective player to discard one of the tiles in hand that is displayed on the respective said tiles-in-hand displaying portion; and
at least one voice sensor mounted in at least one of said computer and said four player consoles,
wherein said wireless communication means comprises a first wireless interface mounted in said computer, and a second wireless interface respectively mounted in each said player console for wireless communication with said first wireless interface by a radio frequency.

2. The mahjong game system using touch panel as claimed in claim 1, wherein said touch panel of said computer defines four rest-tiles-in-hand displaying portions adapted for displaying the rest tiles in hands of the respective players.

3. The mahjong game system using touch panel as claimed in claim 1, wherein said radio frequency is Bluetooth, Wi-Fi RF or other wireless communication protocol.

4. The mahjong game system using touch panel as claimed in claim 1, wherein said specific voice commands are: "Hu" (complete a winning hand), "Pung" (take a tile to complete a set of three), "Kong" (take a tile to complete a set of four identical tiles), "Ting" (waiting hand/on the spot), "Chow" (take a tile to complete a straight) and "Mo" (draw a tile).

5. The mahjong game system using touch panel as claimed in claim 1, wherein said specific game commands are: "Hu" (complete a winning hand), "Pung" (take a tile to complete a set of three), "Kong" (take a tile to complete a set of four identical tiles), "Ting" (waiting hand/on the spot), "Chow" (take a tile to complete a straight) and "Mo" (draw a tile).

6. The mahjong game system using touch panel as claimed in claim 1, wherein said computer has built the at least one voice sensor.

7. The mahjong game system using touch panel as claimed in claim 1, wherein each said player console has built the one said voice sensor.

8. The mahjong game system using touch panel as claimed in claim 1, wherein said computer has installed an application program, said application program being downloaded by said computer from the internet via said first wireless interface or said wired communication means for running by said computer.

9. The mahjong game system using touch panel as claimed in claim 8, wherein said application program is selectively a chess game program or monopoly game program.

10. The mahjong game system using touch panel as claimed in claim 1, wherein said computer is capable of downloading TV signals from the Internet through said first wireless interface or said wired communication means, and playing the downloaded TV signals on said touch panel.

11. The mahjong game system using touch panel as claimed in claim 1, wherein said computer further comprises a TV antenna and a tuner module, said tuner module being electrically connected to said TV antenna and said computer, said computer displaying a tuner interface on said touch panel for allowing the user to control said tuner module for selecting channels, said TV antenna being adapted for receiving wireless TV signals, said tuner interface being operable by the user to select the desired channel for enabling the received TV signal to be played on said touch panel.

* * * * *